United States Patent [19]

German et al.

[11] 4,064,923

[45] Dec. 27, 1977

[54] TIRE VALVE ASSEMBLY

[75] Inventors: Dale F. German, Roxboro; Charles Nidle, Durham, both of N.C.

[73] Assignee: Eaton Corporation, Cleveland, Ohio

[21] Appl. No.: 676,437

[22] Filed: Apr. 13, 1976

[51] Int. Cl.² ............................................. B60C 29/00
[52] U.S. Cl. ..................................... 152/427; 152/415
[58] Field of Search ....................... 152/427, 415, 429; 137/223, 231; 251/145

[56] References Cited

U.S. PATENT DOCUMENTS

| 2,844,183 | 7/1958 | McCord et al. | 152/427 |
| 3,087,529 | 4/1963 | Morton | 152/427 |
| 3,511,295 | 5/1970 | Kilmarx | 152/427 |

Primary Examiner—Drayton E. Hoffman
Attorney, Agent, or Firm—Teagno & Toddy

[57] ABSTRACT

A two piece valve assembly is provided for snap-in installation in a mounting rim for a tubeless tire. The assembly comprises a generally cylindrical valve stem member insertable in a bore formed through an elastomeric grommet member, which is in turn insertable in a bore formed through the mounting rim. The valve stem and grommet members are sized to effect a fluid pressure seal when the insertions are accomplished, and an enlarged flange is provided on the valve stem to prevent outward removal of the assembly from the rim bore.

2 Claims, 6 Drawing Figures

TIRE VALVE ASSEMBLY

BACKGROUND OF THE INVENTION

Description of the Prior Art

Valve assemblies for permitting inflation of a tubeless vehicle tire through its mounting rim are well known in the prior art. They have consisted generally of a threaded cylindrical stem member receiving a valve core and generally fabricated from a metal such as brass, and a resilient grommet adapted to be inserted in a bore formed through the mounting rim. A seal between the brass stem and the grommet has been effected by chemically bonding the grommet to the stem. It is in the creation of this sealing interface that the chief disadvantages of the prior art valve assemblies has been noted. To bond the stem and grommet together great care must be taken in the cleaning, handling and surface treatment of the valve stem, particularly where it is formed from brass. In spite of the attention given to these matters in the industry an undesirably high rate of scrappage due to ineffective bonds has been experienced.

Also known in the prior art are valve assemblies configured for inflation of devices other than tires which effect a seal between a stem member and a grommet through a crimped mechanical connection. One example of such a valve is seen in U.S. Pat. No. 3,754,731. Since the crimping must be accomplished at the time of assembly, the cost to manufacture such a device in high volume is unacceptably high.

SUMMARY OF THE INVENTION

Responsive to the disadvantages found in the prior art, it is an object of the present invention to provide a valve assembly devoid of a chemically bonded seal for permitting inflation of a tubeless tire through its mounting rim.

It is another object to provide a tire valve assembly which effects a fluid pressure seal upon insertion into the tire mounting rim.

According to one feature of the invention a valve stem and an elastomeric grommet are configured to effect sealing engagement of the valve stem with the grommet and of the grommet with the mounting rim upon insertion of the valve stem into the grommet and the resulting assembly into a bore formed through the mounting rim.

BRIEF DESCRIPTION OF THE DRAWINGS

These and other objects and features will be obvious to those skilled in the art upon reading the accompanying detailed description with reference to the attached drawing in which.

DESCRIPTION OF THE PREFERRED EMBODIMENT

Figure 1:
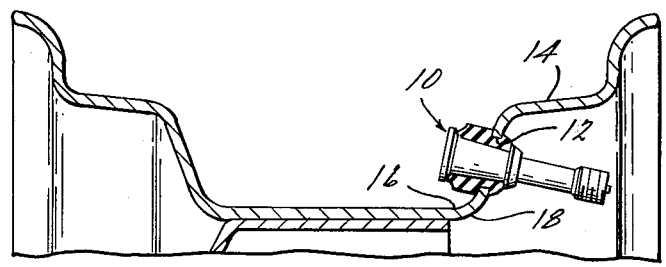
FIG. 1 is a cross sectional view of a mounting rim for a tubeless tire in which a valve assembly of the present invention is installed.

Referring first to FIG. 1, a tire valve assembly 10 is illustrated as installed in a bore 12 formed through a mounting rim 14 for a tubeless tire. The valve assembly 10 is illustrated as engaging the inner periphery of the bore 12 and the inner and outer annular surfaces 16, 18, respectively, of the rim in a manner to be described in more detail below.

Figure 2:
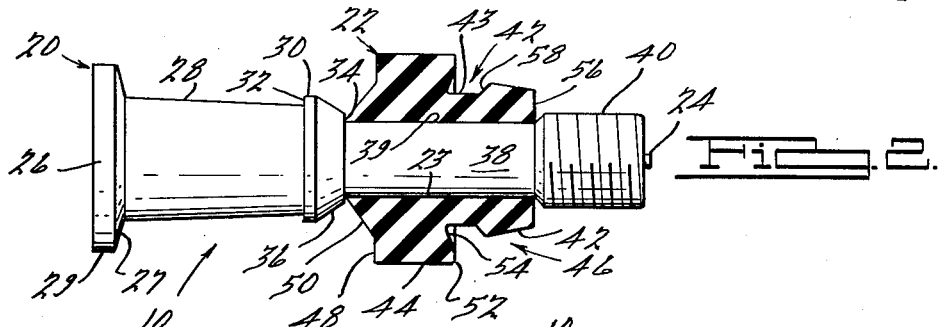
FIG. 2 is a partially sectioned view of the valve assembly of the present invention in which the valve stem is inserted into the grommet.
Figure 6:
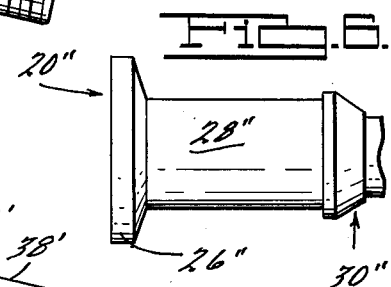
FIG. 6 is an elevational view of a portion of an alternative embodiment of the valve stem.

Turning now to FIG. 2, the valve assembly 10 is illustrated as comprising a generally cylindrical valve stem member 20 and an elastomeric grommet member 22. The valve stem member 20 may be formed of many suitable materials including metals and plastics but is formed of brass in the preferred embodiment. It is internally machined to receive a known valve core 24 to allow the passage of air into the tire. It is its external configuration that contributes to the effectiveness of the invention valve assembly. The outer periphery of the valve stem member 20 is formed to include a cylindrical inner flange portion 26 having a chamfer 27 formed on the inner face thereof. A cylindrical sealing body portion 28 extends axially from the chamfer 27 and is preferably, but not necessarily, tapered approximately two degrees with respect to the axis of the valve stem member 20. FIG. 6 illustrates valve stem member 20 "in which the sealing body portion 28" does not include the taper. The sealing body portion 28 in the preferred embodiment terminates at an outer flange portion 30 having flat inner and outer faces 32 and 34, respectively, and having a lead chamfer 36 forming an angle of approximately thirty degrees with the axis of the valve stem member 20 extending outwardly of the outer face 34 formed thereon. A cylindrical stem portion 38 having an outer diameter less than that of the sealing body diameter 26 extends axially from the outer face 34 and terminates in a threaded portion 40 adapted to be connected to a source of compressed air (not shown).

The elastomeric grommet member 22 is substantially cylindrical. It includes a centrally located through bore 23 and has a circumferentially extending groove 42 formed in its outer periphery which thereby defines an inner flange portion 44 and an outer lip portion 46. The inner flange portion includes a flat inner face 48 having a frustoconical projection 50 extending inwardly therefrom. The inner flange portion 44 further includes a flat outer face 52. An inward extending chamfer surface 54 extends from the outer face 52 to a circumferential sealing diameter 43 of the groove 42. The outer lip portion 46 includes a flat outer face 56 and a chamfered inner face 58 and its outer periphery 47 tapers to a reduced diameter less than the diameter of the rim bore 12 from the inner face 56 to the outer face 58.

Figure 3:
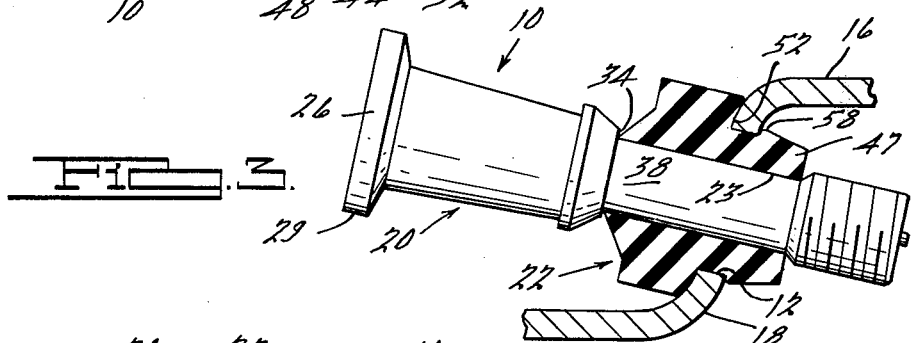
FIG. 3 is another partially sectioned view in which the assembly of FIG. 2 is inserted into a bore formed in the mounting rim.
Figure 4:
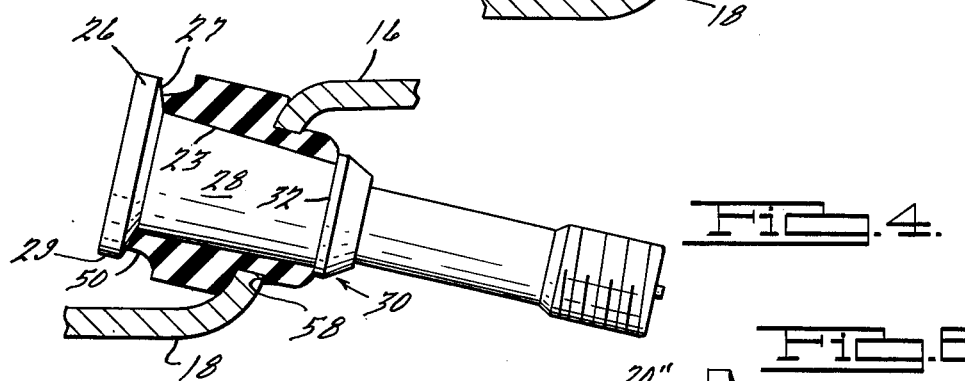
FIG. 4 is a partial sectional view similar to FIG. 3 in which the valve stem is moved axially to its fully assembled sealing position.

By referring now sequentially for FIGS. 2, 3, and 4 the simple and economical assembly and installation of the invention valve assembly may be understood. As a first step in the assembly the valve stem member 20 is inserted into the grommet 22 so that the stem portion 38 is received, as shown in FIG. 2, in the through bore 23 whose free diameter is approximately equal to the outer diameter 39 of the stem portion 38.

With the valve stem member 20 and the grommet 22 so positioned, the parts are together inserted outwardly through the rim bore 12 as shown in FIG. 3. The tapered surface 47 of lip portion 46 facilitates the insertion, and further outward passage of the grommet 22 is arrested as the flat outer face 52 and the chamfered surface 54 engage the inner surface 16 of the rim 14. The sealing groove diameter 43 engages the rim bore 12, since its diameter when so positioned is slightly greater than that of the rim bore 12. Chamfered inner surface 58 of the lip portion 46 is positioned in confronting relationship with the outer surface 18 of the rim 14.

Further insertion of the valve stem member 20 causes the body portion 28 to register with the through bore 23 of the grommet 23 as may be seen in FIG. 4. Since the diameter of the body portion 28 is substantially greater than the free diameter of the bore 23, radially compressive sealing engagement is effected therebetween and concurrently between the sealing groove diameter 43 and the rim bore 12. The grommet 22 is also axially compressed when in the assembled position of FIG. 4 since the free length of the grommet is less than the axial space defined by the valve stem portions 26, 30. The outward facing surfaces 52, 54 of the flange portion 48 and the inward facing surface 58 of the lip portion 46 are thus brought into engagement with the inner and outer rim surfaces 16, 18, respectively as the chamfered surface 27 of flange portion 26 and the inner face 32 of flange portion 30 abut the frustoconical projection 50 and the flat end face 56 of the grommet 22, respectively.

The lead chamber 36 of flange portion 30 facilitates insertion of the valve stem member 20 into the through bore 23. Pivotal flexibility of the valve stem member 20 to further aid in its final positioning is enhanced by the provision of the taper on the body portion 28, the chamfered surface 27 and the frustoconical projection 50. Removal of the valve assembly 10 from the assembled position of FIG. 4 in the outward direction is prevented by sizing the outer diameter 29 of flange portion 26 larger than the rim bore 12.

Figure 5:
FIG. 5 is a partial sectional view similar to FIG. 4 disclosing an alternative embodiment of the invention valve assembly.

FIG. 5 illustrates an alternative embodiment in which inadvertent removal of the valve assembly 10 in the inward direction is prevented. The FIG. 5 embodiment is substantially identical to the preferred embodiment with the exception that a groove 29 is formed in the outer periphery of the sealing body portion 28' adjacent the flange portion 30' to receive a retaining member 33, such as a snap ring, sized to prevent passage through the rim bore 12.

While the invention valve assembly has been disclosed in only certain embodiments others are possible without departing from the essence of the invention as claimed.

What is claimed is:

1. A housing assembly for snap-in installation in an aperture provided in a wheel rim, said assembly comprising:
   A. a tubular grommet formed of elastomeric material having first portions thereof defining a circumferential shoulder about the outer periphery thereof and second portions formed on the outer periphery thereof defining a surface adapted to be received in closely fitting relationship with the inner periphery of said rim aperture, said shoulder being adapted for contacting the inner surface of said rim adjacent said aperture;
   B. an elongated generally cylindrical stem member having a first circumferential flange portion provided on the outer periphery thereof, said first flange being sized to prevent passage through said rim aperture, said stem having a second flange portion provided thereon and longitudinally spaced from said first flange portion by an amount less than the free length of said grommet with said second flange portion being sized to pass through said rim aperture, said stem having the outer periphery thereof defining a third portion in the region intermediate said first and second flange portions said third portion being sized to provide an interference fit when received in the inner periphery of said grommet; and
   C. said stem having a pilot portion adjacent said second flange portion, said pilot portion having the inner periphery of said grommet received thereover in a slip fitting arrangement such that, upon initial insertion of said grommet, with said stem pilot portion received therein into said rim aperture from the interior side thereof and registry of said second portion of said grommet against the inner surface of said rim adjacent said aperture with portions of said grommet extending through said aperture, further movement of said grommet in said aperture is prevented and upon further insertion of said stem through said aperture and passage of said second flange portion of said stem through the inner periphery of said grommet disposing said first flange portion on the opposite side of said rim aperture from said first stem flange portion and upon application of a longitudinal force to said stem causing compression of portions of said grommet intermediate said first stem flange and said rim, said second stem flange passes through said grommet and extends free thereof and upon release of said longitudinal force on said stem, said grommet is longitudinally compressed between said first and second stem flanges and the said portions of said grommet extending through said aperture are compressed longitudinally to provide a fluid pressure seal around said rim aperture between said grommet shoulder on one side of said rim aperture and said grommet portions extending through said aperture on the other side of the said rim aperture.

2. A tubeless tire valve assembly for snap-in installation in an aperture provided in a wheel rim, said assembly comprising:
   A. a tubular grommet formed of elastomeric material having first portions thereof defining a circumferential shoulder about the outer periphery thereof and second portions formed on the outer periphery thereof defining a surface adapted to be received in closely fitting relationship with the inner periphery of said rim aperture, said shoulder being adapted for contacting the inner surface of said rim adjacent said aperture;
   B. an elongated valve stem having a first circumferential flange portion provided on the outer periphery thereof, said first flange being sized to prevent passage through said rim aperture, said stem having a second flange portion provided thereon and longitudinally spaced from said first flange portion by an amount less than the free length of said grommet with said second flange portion being sized to pass through said rim aperture, said stem having the outer periphery thereof defining a third portion in the region intermediate said first and second flange portions said third portion being sized to provide an interference fit when received in the inner periphery of said grommet; and C. said stem having a pilot portion adjacent said second flange portion, said pilot portion having the inner periphery of said grommet received thereover in a slip fitting arrangement such that, upon initial insertion of said grommet, with said stem pilot portion received therein into said rim aperture from the interior side thereof and registry of said second portion of said grommet against the inner surface of said rim adjacent said aperture with portions of said grommet extending through said aperture, further movement of said grommet in said aperture is prevented and upon further insertion of said stem through said aperture and passage of said second flange portion of said stem through the inner periphery of said grommet disposing said first flange portion on the opposite side of said rim aperture from said first stem flange portion and upon application of a longitudinal force to said stem causing compression of portions of said grommet intermediate said first stem flange and said rim, said second stem flange passes through said grommet and extends free thereof and upon release of said longitudinal force on said stem, said grommet is longitudinally compressed between said first and second stem flanges and the said portions of said grommet extending through said aperture are compressed longitudinally to provide a fluid pressure seal around said rim aperture between said grommet shoulder on one side of said rim aperture and said grommet portions extending through said aperture on the other side of said rim aperture.

* * * * *

UNITED STATES PATENT AND TRADEMARK OFFICE
CERTIFICATE OF CORRECTION

PATENT NO. : 4,064,923
DATED : 12/27/77
INVENTOR(S) : Dale F. German; Charles Nidle It is certified that error appears in the above-identified patent and that said Letters Patent are hereby corrected as shown below:

Col. 3, line 15: "grommet 23" should read "grommet 22".

Signed and Sealed this

Second Day of May 1978

[SEAL]

Attest:

RUTH C. MASON
Attesting Officer

LUTRELLE F. PARKER
Acting Commissioner of Patents and Trademarks